United States Patent
Upton et al.

(10) Patent No.: US 7,647,531 B2
(45) Date of Patent: Jan. 12, 2010

(54) OVERRIDING DAUGHTERBOARD SLOTS MARKED WITH POWER FAULT

(75) Inventors: John Daniel Upton, Georgetown, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 12/141,743

(22) Filed: Jun. 18, 2008

(65) Prior Publication Data

US 2008/0244313 A1 Oct. 2, 2008

Related U.S. Application Data

(63) Continuation of application No. 11/149,394, filed on Jun. 9, 2005, now Pat. No. 7,412,629.

(51) Int. Cl.
*G06F 11/00* (2006.01)
(52) U.S. Cl. .......................... 714/44; 710/316
(58) Field of Classification Search .................. 714/25, 714/26, 31, 37, 38, 43, 44, 56; 710/312, 710/313, 316
See application file for complete search history.

(56) References Cited

U.S. PATENT DOCUMENTS 5,497,490 A * 3/1996 Harada et al. ............... 713/100

(Continued)

FOREIGN PATENT DOCUMENTS

EP 0802487 A2 10/1997

OTHER PUBLICATIONS

"Automatic Retry of Slot on Command by Hot Plug Controller for Highly Capacitive PCI Adapters", IBM Research Disclosure, Feb. 2002, p. 339.

(Continued)

*Primary Examiner*—Nadeem Iqbal
(74) *Attorney, Agent, or Firm*—Yee & Associates, P.C.; Diana R. Gerhardt

(57) ABSTRACT

Having detected an anomalous fault in a peripheral I/O slot, a processor entity may need to perform some remedial action, wherein the peripheral slot may have a fault line. First a voltage may be detected on the slot. Processor entity may set a fault if a voltage is found. A hotplug controller which may provide outputs that the processing entity may store as a fault syndrome word. The service processor or operating system, either during initial program load, or at another time, may detect that the fault could be a false fault depending on a set of predefined conditions and following the mechanism described here can then clear the fault earlier set. If an action from a previous device list is set, then there may be a clearing of the voltage fault based on determining that the action is set.

5 Claims, 3 Drawing Sheets

U.S. PATENT DOCUMENTS

| | | |
|---|---|---|
| 6,088,762 A | 7/2000 | Creta |
| 6,223,299 B1 | 4/2001 | Bossen et al. |
| 6,330,694 B1 | 12/2001 | Hong et al. |
| 6,523,140 B1 | 2/2003 | Arndt et al. |
| 6,574,752 B1 | 6/2003 | Ahrens et al. |
| 6,614,752 B1 | 9/2003 | Parrish et al. |
| 6,708,283 B1 * | 3/2004 | Nelvin et al. ................. 714/5 |
| 6,751,754 B2 | 6/2004 | Tsai et al. |
| 2002/0184576 A1 * | 12/2002 | Arndt et al. .................. 714/48 |
| 2003/0093604 A1 | 5/2003 | Lee |
| 2004/0064761 A1 * | 4/2004 | Harrington et al. ............ 714/43 |

OTHER PUBLICATIONS

"Identifying Field Replacement Parts by Querying and Reporting Vital Product Data", IBM Research Disclosure, Dec. 1999, p. 1726.

* cited by examiner

OVERRIDING DAUGHTERBOARD SLOTS MARKED WITH POWER FAULT

This application is a continuation of application Ser. No. 11/149,394, filed Jun. 9, 2005, status allowed.

BACKGROUND OF THE INVENTION

1. Field of the Invention

The present invention generally relates to the art of configuration management and fault detection in modular electrical systems, and more particularly to permitting alternate voltage sources to be applied to daughterboards without conflicts from primary systems that may apply a voltage.

2. Description of the Related Art

Enterprise server systems usually have external input/output (I/O) devices for expansion. The most common expansion bus interface used for this is Peripheral Component Interconnect (PCI) and its extended and improved version PCI-X. When a system supports hot plug capabilities, power to the PCI slots is controlled by hot plug controller modules, hereinafter "hotplug controller", that are capable of detecting voltage faults and disabling the slot if a fault is found. There are cases where anomalous or false power faults can be detected if a voltage is found in the lines going to the PCI slot prior to the motherboard or system planar powering on. The anomalous fault may happen if an external device connected to the PCI adapter or card is powered on before the motherboard finishes an initial program load. This often happens in the case where external devices are shared between different server systems.

A problem may develop if the external device is powered on before the PCI slots are powered on. No problem develops if the external device is powered on after the PCI slots have been powered-on. However an anomalous fault often occurs if the timing is reversed. That is, the fault is based merely on the timing of applying power, and not on any real defect in the card or supporting system. The problem results in a person performing a manual hotplug operation when the anomalous power fault occurs. Only then, is a person able to properly configure the PCI slot for the system. Otherwise, the PCI slot remains in an unconfigured or disabled state.

A previous solution for the problem was to add extra hardware, such as diodes, inverters or other devices, to prevent current back flow into the PCI slots from the card. Unfortunately, this solution is either not effective or too expensive in situations where a power feedback problem is discovered in motherboards that are already in use in the field. Moreover, additional hardware means greater expenses in assembly, inventory and other costs of production for those motherboards that are intended to be made.

Thus, it would be advantageous if a series of steps or inexpensive apparatus could identify an anomalous power fault and assure that the affected slot is configured or otherwise enabled.

SUMMARY OF THE INVENTION

The present invention provides a method, apparatus, and computer usable code to process faults. Having detected an anomalous fault in a peripheral I/O slot, a processor entity may need to perform some remedial action, wherein the peripheral slot may have a fault line. First, a voltage may be detected on the slot. Processor entity or the hotplug controller may set a fault if a voltage that does not meet a set of criteria is found. A hotplug controller which may provide outputs that the processing entity may store as a fault syndrome word. The service processor or operating system, either during initial program load, or at another time, may detect that the fault could be a false fault depending on a set of predefined conditions and following the mechanism described here can then clear the fault earlier set. If an action from a fault lookup table is set, then there may be a clearing of the voltage fault based on determining that the action is set.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
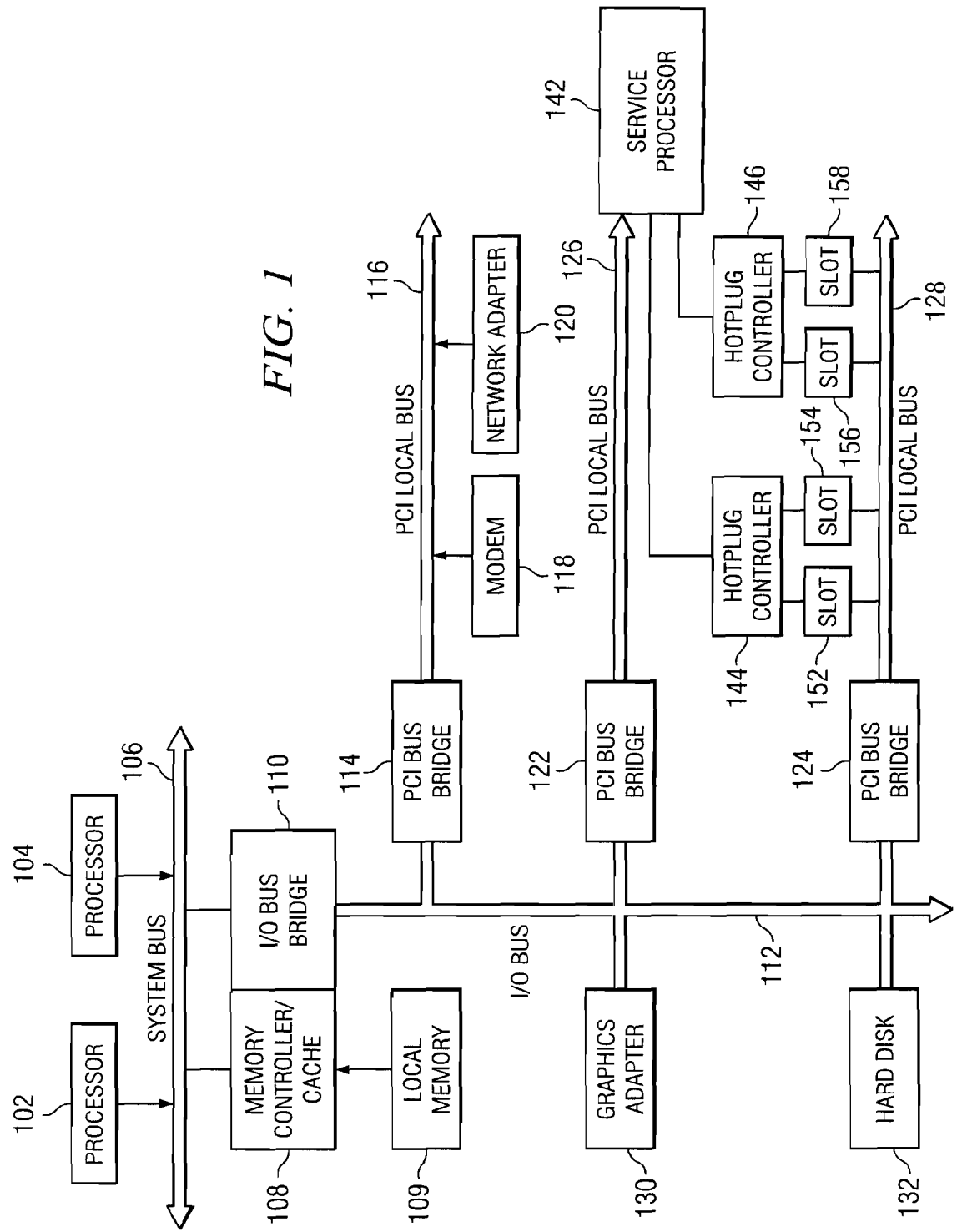
FIG. 1 shows a computer processor of the present invention in block form in accordance with the illustrative embodiment of the present invention.

With reference now to the figures, FIG. 1 is a block diagram of a data processing system depicted in accordance with an illustrative embodiment of the present invention. Data processing system of FIG. 1 may be a symmetric multiprocessor (SMP) system including a plurality of processors 102 and 104 connected to system bus 106. Alternatively, a single processor system may be employed. Also connected to system bus 106 is memory controller/cache 108, which provides an interface to local memory 109. I/O Bus Bridge 110 is connected to system bus 106 and provides an interface to I/O bus 112. Memory controller/cache 108 and I/O Bus Bridge 110 may be integrated as depicted.

Peripheral Component Interconnect (PCI) bus bridge 114 connected to I/O bus 112 provides an interface to PCI local bus 116. A number of adapters may be connected to PCI local bus 116. Typical PCI bus implementations will support four PCI expansion slots or add-in connectors, for example, modem 118 and network adapter 120 connected to PCI local bus 116 through add-in connectors. Specifications for improved I/O occur from time to time as published by PCI-SIG, the Special Interest Group for Peripheral Component Interconnect standards. Consequently, references to PCI-X and various numbered versions of PCI-X are included when mentioning PCI.

Additional PCI bus bridges 122 and 124 provide interfaces for additional PCI local buses 126 and 128, from which additional network, storage or other type of adapters may be supported. In this manner, data processing system of FIG. 1 allows connections to multiple network computers. A memory-mapped graphics adapter 130 and hard disk 132 may also be connected to I/O bus 112 as depicted, either directly or indirectly.

Hotplug functionality for card slots or daughterboard slots, 152, 154, 156 and 158 may be provided through one or more hotplug controllers 144, and 146. The hotplug controller 144 may monitor conditions in slots 152 and 154 and report such conditions to service processor 142. Service processor 142 may provide initial program load features and support for hosting multiple partitions and operating systems on the several processors, including processor 102 and processor 104. Initial program load (IPL) is typically accomplished at system power-on time, wherein the instructions of IPL may be stored in the system's initial program load (IPL) read only memory (ROM). The initial program load ROM code is relatively primitive in the types of operations that can be performed, and is primarily used to boot-up the system prior to loading and executing the more general purpose operating system software.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 1 may be, for example, an IBM eServer™ pSeries system®, a product of International Business Machines Corporation in Armonk, N.Y., running the Advanced Interactive Executive (AIX®) operating system or LINUX® operating system. Nevertheless, this does not limit in any way the implementation of the invention to this specific type of hardware.

Figure 2:
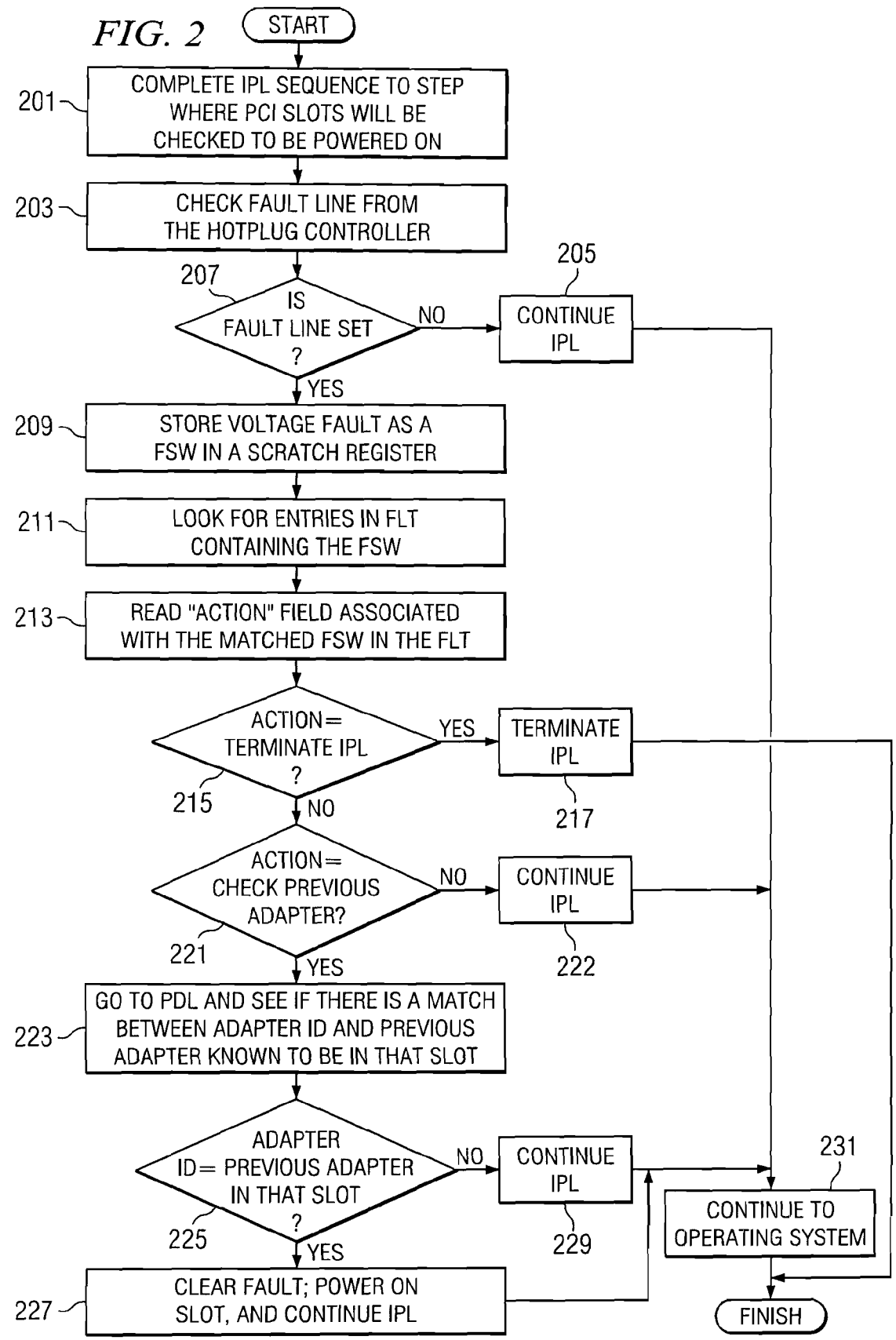
FIG. 2 shows a flow diagram in accordance with a first illustrative embodiment of the present invention.

FIG. 2 shows a series of steps that may be performed by service processor 142 of FIG. 1, or by an operating system running on one or more of the processors 101 and 104. In either event, the steps are performed by a processor entity.

Initially the processor entity runs an initial program load (IPL) which may be executed and may operate to a point where the IPL should provision and possibly fault check slots (step 201). Processor entity may sense or detect a voltage fault from one or more hotplug controllers, for example, 144 or 146. Some hotplug controllers, for example, MIC2593 by Micrel®, have a register with a bit for each of the voltages that the MIC2593 detects, up to four.

In the usage of this invention, the term "check a fault line" or "detecting a voltage fault" shall include, but not be limited to, monitoring or otherwise measuring voltages on power providing conductors as may be found in the Intersil® product, as well as storing to latches, memory or register of the Micrel-type devices. A hotplug controller detects the presence of various unexpected voltages on one or more conductors. The hotplug controller is detecting the presence of at least one voltage fault on the slot.

Processor entity may check a fault line (step 203). The checking may include identifying a unique adapter identifier for the adapter in the slot. The processor entity may check the fault line from hotplug controllers 144 and 146. An absence of a fault results in continuing execution of initial program load for functions other than PCI fault detection (step 205). If the processor entity detects a fault (step 207), then processor entity follows by storing a fault syndrome word (FSW) for each slot that indicated a voltage fault (step 209). A fault syndrome word is a word or set of bits defining one or more conditions or voltage faults discovered in a slot. The fault syndrome word may have, for example, four bits indicating each of the possible voltages that could present a fault, for example, +12.0 volts, −12.0 volts, +3.3 volts and +5.0 volts. As an example, if hotplug controller 144 identifies a fault in the +12.0 volt line, then hotplug controller 144 will set a fault syndrome word to a binary 1000, assuming that the first bit position from the left corresponds to +12.0 volts fault.

The processor entity may detect a bit set, for example, from a Micrel hotplug controller, indicating power. When the processor entity detects power, a "yes" branch is taken at the "fault line set" test (step 207). The "yes" branch leads to processor entity storing a fault syndrome word (step 209). Storing may be to a scratch register. Encoding schemes other than four-bit binary words may be used for storing the fault syndrome word. In the example of this embodiment of the invention, processor entity records by setting a bit for any voltage detected that is approximately +12.0 volts, −12.0 volts, +3.3 volts and +5.0 volts.

The processor entity may accompany the storing of the fault syndrome word (step 209), with a step of setting a fault. Setting a fault includes setting the device tree for the slot to show that the slot is in a fault state. A fault state may be recorded as "unknown", "faulty" or "occupied" but not configured. The different terminology to define a slot in a fault state is operating system dependent. Though the device tree may store or otherwise represent a slot status with specific strings, there are other ways, including binary storage, to identify uniquely the condition of the slot.

TABLE 1

Example embodiment of a fault lookup table

| Fault Syndrome Word | Adapter identifier | Action |
|---|---|---|
| 0000 | abcdef | check previous adapter |
| 1100 | abcdef | Continue IPL |
| 0100 | uvwxyz | Continue IPL |
| 0010 | uvwxyz | Continue IPL |
| 0001 | uvwxyz | Terminate IPL |

The processor entity looks up, based on each slot identifier that has a fault line set, an entry or record (step 211). The lookup may be within a data structure known as the fault lookup table (FLT) containing a fault syndrome word (FSW) (step 213).

Table 1 shows an exemplary fault lookup table. The fault lookup table may contain three fields: 1) a table adapter identifier or card identifier, 2) a table fault syndrome word, and 3) an action, wherein the action is associated with the entry. These three fields exist for each fault lookup table entry. Actions stored in the fault lookup table may guide the processing according to this embodiment. Possible action values may be 1) "terminate initial program load"; 2) "continue initial program load"; and 3) "check previous adapter". It is appreciated that table 1 represents each condition with mnemonics that show English using, for example, a standard American standard code for information interchange character set. Alternatively, the three action values may be stored in a binary format, where each value corresponds to a different condition. The processor entity reads or stores the action associated with the entry having a table fault syndrome word matching the fault syndrome word (step 213).

After the processor entity finds an entry having a table fault syndrome word that matches the fault syndrome word of the slot, some tests are performed to determine further processing based on the "action" field of the fault lookup table entry. The first test checks if action field is "terminate initial program load" which results in "yes" or "no" (step 215). If the result is "yes", the processor entity may continue with a series of steps that terminate the initial program load (step 217). The series of steps that terminate the initial program load may include providing some diagnostic outputs as is known in the art. If the action is other than "terminate initial program load", processor entity executes a second test. A "no" result allows processor entity to perform a second test.

The second test checks whether the action field is "check previous adapter" which results in "yes" or "no" (step 221). A "no" result causes processor entity to continue the initial program load (step 222). A "yes" result causes the processor entity to look up a previous device list (step 223). Firmware may create the previous device list, shown in table 2, to store information from the device tree during system configuration. The previous device list may include a list of adapter identifiers and the slot where each adapter identifier is located at the time of the initial program load. Thus, using the slot that currently shows a fault as an index, the processor entity may look up an adapter identifier recorded to be in the slot from the prior initial program load, also known as the adapter identifier previously in the slot (step 223).

After manufacture, the previous device list may be empty in the previous device list device fields or configured to reflect adapter identifiers installed at the factory. Previous device list may be stored in persistent storage, such as non-volatile memory.

TABLE 2

Example of a previous device list

| Slot number | Previous device list device |
| --- | --- |
| 1 | abcdef |
| 2 | uvwxyz |

Still further, table 2 may include strings other than industry standard adapter identifiers within the table adapter identifier field. For example, advantages may occur if one or more wild-card characters appear in the string of the table adapter identifier field. Such wild-card characters may use the '*' character. Thus, a single entry having a wild-card table adapter identifier field may permit a loose matching. The processor entity may perform a loose matching, which matches a tract of adapter identifiers that may be assigned to a manufacturer, and further be assigned to a particular kind of device by the manufacturer (step 223).

Following a look up previous device list (step 223), a determination is made to determine whether the entry in the previous device list having the slot has a previous device list device that matches the unique adapter identifier (step 225). If the unique adapter identifier matches the adapter identifier previously in the slot, that is, a "yes" from step 225, then the processor clears the fault line of the slot 152, 154, 156 and 158, and the initial program load is continued (step 227). Such clearing of the fault line may include, clearing a register or other storage that has a fault bit set for the particular slot. The fault can be cleared without fear of damaging any hardware because finding the action of "check previous adapter" in the fault lookup table implies that the type of adapter has been known to generate the fault identified by the fault syndrome word, in certain timing conditions during power up of the slots.

Otherwise, a "no" from step 225 causes the processor entity to continue the initial program load without clearing the hotplug controller fault (step 229). The fault is not cleared in the "no" case because the adapter that is present in the slot has not been known to present false faults, and therefore a real power fault is likely to be present. Under a likely true fault condition, the embodiment treats the condition as not safe to clear the fault. Furthermore, the embodiment does not enable the slot before continuing with the initial program load.

Execution through clearing the fault line of the hotplug controller effectively clears a fault in the case of an anomalous power fault (step 227).

Following steps 222 and 229, processor entity may execute the operating system (step 231). Such steps may include updating the previous device list.

A simplified embodiment of the fault lookup table may provide only for the presence of a "check previous adapter". The processor entity may treat the absence of such a field as a desire to continue the IPL. As such, the action field may be encoded in a single bit, and the presence of a "1" bit is understood to be merely an action, that is, to check previous adapter, whereas a "0" bit is the absence of an action. Note that the simplified embodiment lacks a "terminate IPL" action.

Figure 3:
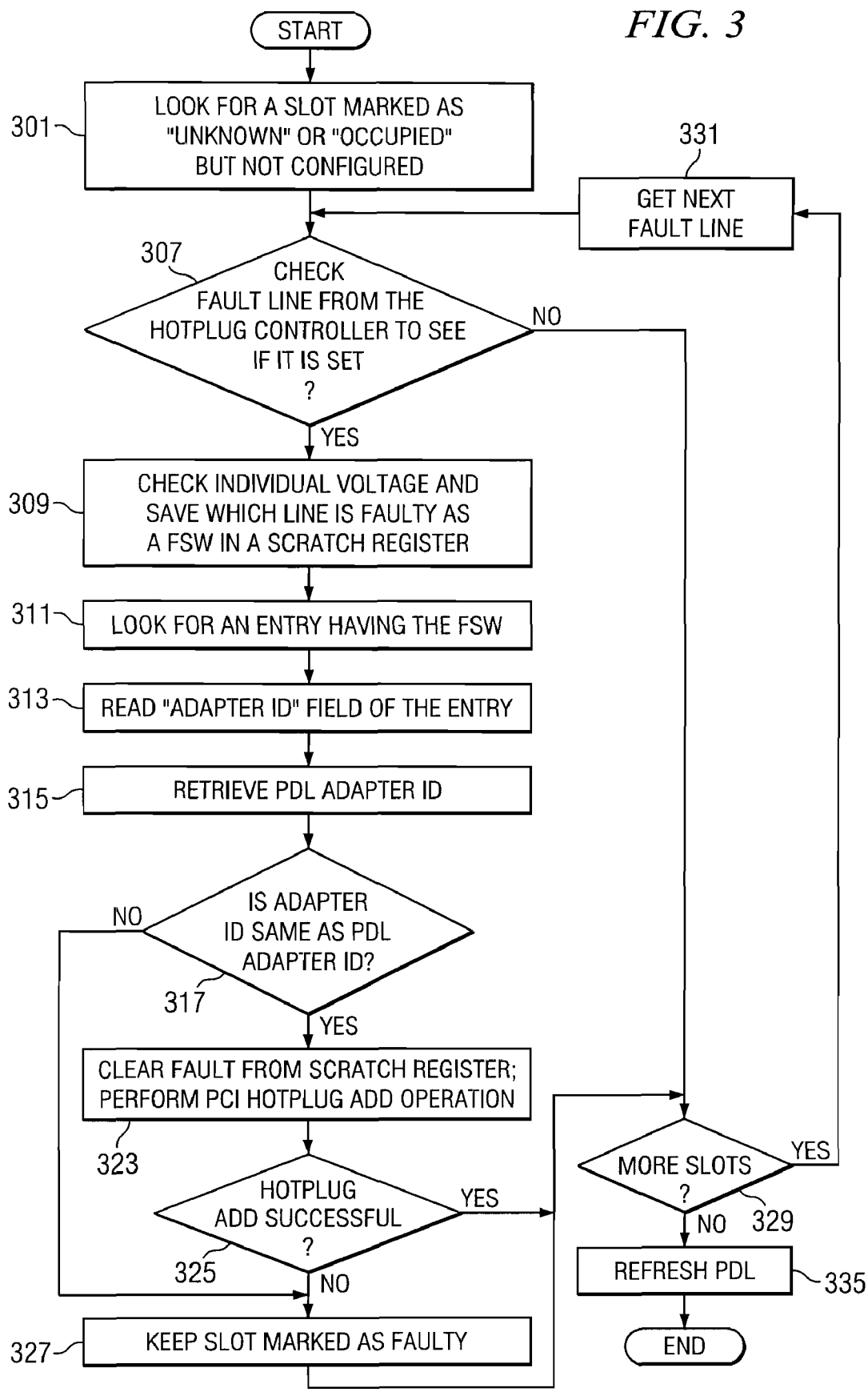
FIG. 3 shows a flow diagram in accordance with a second illustrative embodiment of the present invention.

FIG. 3 shows an alternative embodiment that may be used before the operating system starts running applications or during dynamic reconfiguration operations. First, following completion of initial program load, look at each slot status that is associated with a power fault in a data structure, for example, a device tree (step 301). Such faults may include diagnostic states such as "unknown" or "occupied" but not configured. For each slot, the processor entity checks the fault line for a voltage fault for the affected slot (step 307). If a voltage fault is set, the processor entity stores which line is faulty as a fault status word in a scratch register (step 309). If the voltage fault is not set, the processor entity determines whether more slots remain for checking (step 329).

Following the save to the scratch register, the processor entity looks for a fault lookup table entry in the fault lookup table (FLT), provided an entry matches the fault syndrome word (step 311). The processor entity may also look up or read a unique adapter identifier of the entry from the device tree (step 313).

Next, the processor entity retrieves the previous device list using the slot number as a key to obtain the previous adapter identifier (step 315). A determination (step 317) is made if the adapter identifier is the same or matches the previous adapter identifier for that slot. Absent a match, then the processor assures that the previous device list remains unchanged by keeping the current slot marked as faulty (step 327). Otherwise, a match is followed by clearing the fault by, for example, clearing the fault from the scratch register and performing a hotplug add operation (step 323). A successful hotplug will permit reconfiguration of the slot, that was previously marked as "faulty" or "unconfigured" or the like. Only the software or firmware steps of a hotplug add operations need to be performed. No need for physically removing and adding the slot should be required. A check may be made to see if the hotplug add operation completed successfully (step 325). Such a hotplug operation is known as clearing the fault, if it is successful. However, a checking is not required for the fault to be cleared. If the hotplug operation was not successful, then the processor assures that the previous device list remains unchanged (step 327). A positive determination of determining hotplug success (step 325) continues processing to a check for additional slots not yet processed (step 329).

If more slots are present, or a "yes" occurs, then the processor gets or otherwise senses the next slot's fault line (step 331). This step is followed by a checking the fault line to see if it is set (step 307), and processing continues as before from this checking step.

A final step of this embodiment, after determining no further slots remain unexamined by the embodiment (step 307) may be to refresh the previous device list (PDL) (step 335). Refreshing the previous device list will actually change the previous device list if a hotplug add succeeded during one or more iterations of the determining hotplug add successful (step 325).

Thus, an adapter that receives its power from a second system may be restored from a faulty state to an enabled state.

Peripheral interconnect, in addition to including peripheral component interconnect (PCI), peripheral component interconnect express (PCI-X) or any future version of the PCI family. Steps performed by a processor entity described herein, may be performed in whole, or in part, on a hotplug controller.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising:
   a computer usable medium having computer usable program code for correcting an anomalous fault in a peripheral component slot, said computer program product including;
   computer usable program code for, responsive to detecting at least one voltage fault on the slot, creating a fault syndrome word based on the at least one voltage fault on the slot;
   computer usable program code for searching a data structure for an entry matching the fault syndrome word, wherein an action is associated with the entry;
   computer usable program code for determining whether the action is set; and
   computer usable program code for clearing the voltage fault based on a determining that the action is set.

2. The computer program product for correcting of claim 1, wherein the computer usable program code for executing further comprises:
   computer usable program code for identifying a unique adapter identifier for the adapter in the slot.

3. The computer program product for correcting of claim 2, wherein the computer usable program code for executing further comprises:
   computer usable program code for determining whether an entry in the previous device list having the slot has a previous device list device that matches the unique adapter identifier in response to determining that the action is set.

4. The computer program product for correcting of claim 3, wherein the computer usable program code for executing further comprises:
   computer usable program code for determining whether the action is check previous adapter.

5. The computer program product for correcting of claim 3, wherein the computer usable program code for executing further comprises:
   computer usable program code for determining whether the action is not continue initial program load; and
   computer usable program code for determining whether the action is not terminate initial program load.

* * * * *